(12) United States Patent
Ikuma et al.

(10) Patent No.: US 11,982,837 B2
(45) Date of Patent: May 14, 2024

(54) INTERPOSER CIRCUIT

(71) Applicant: Nippon Telegraph and Telephone Corporation, Tokyo (JP)

(72) Inventors: Yuichiro Ikuma, Musashino (JP); Yusuke Nasu, Musashino (JP); Manabu Oguma, Musashino (JP); Takashi Yamada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 331 days.

(21) Appl. No.: 17/427,867

(22) PCT Filed: Jan. 24, 2020

(86) PCT No.: PCT/JP2020/002452
§ 371 (c)(1),
(2) Date: Aug. 2, 2021

(87) PCT Pub. No.: WO2020/162216
PCT Pub. Date: Aug. 13, 2020

(65) Prior Publication Data
US 2022/0120965 A1    Apr. 21, 2022

(30) Foreign Application Priority Data
Feb. 4, 2019 (JP) .................. 2019-018134

(51) Int. Cl.
G02B 6/122 (2006.01)
G02B 6/12 (2006.01)
G02B 6/30 (2006.01)

(52) U.S. Cl.
CPC ......... G02B 6/122 (2013.01); G02B 6/12016 (2013.01); G02B 6/30 (2013.01)

(58) Field of Classification Search
None
See application file for complete search history.

(56) References Cited

U.S. PATENT DOCUMENTS 5,076,654 A * 12/1991 Presby ................. G02B 6/2804
385/129
9,995,881 B1 * 6/2018 Patel .................... G02B 6/4243
(Continued)

FOREIGN PATENT DOCUMENTS

| JP | 2016-24439 A | 2/2016 |
| JP | 2018-506077 A | 3/2018 |
| JP | 2018-77276 A | 5/2018 |

OTHER PUBLICATIONS

M. Ishii et al., *Low-Loss Fibre-Pigtailed 256 Channel Arrayed-Waveguide Grating Multiplexer Using Cascaded Laterally-Tapered Waveguides*, Electronics Letters, vol. 27, No. 23, 2001, pp. 1401-1402.

*Primary Examiner* — Jerry Rahll
(74) *Attorney, Agent, or Firm* — Workman Nydegger

(57) ABSTRACT

An object is to improve crosstalk between ports while keeping an interposer circuit small. In an interposer circuit that includes a first surface connected to an optical circuit, a second surface that is connected to a fiber block and is located opposite to the first surface in parallel with the first surface, and a plurality of connection waveguides connected to a plurality of input/output waveguides included in the optical circuit and a plurality of input/output fibers included in the fiber block, the connection waveguides each have a straight shape, and an angle (θ) formed between the first surface and each of the connection waveguides is the same as an angle (φ) formed between the second surface and each of the connection waveguides.

7 Claims, 11 Drawing Sheets

(56) References Cited

U.S. PATENT DOCUMENTS

| | | | |
|---|---|---|---|
| 10,288,812 B1* | 5/2019 | Evans | G02B 6/30 |
| 2016/0334590 A1* | 11/2016 | Celo | G02B 6/1225 |
| 2018/0024299 A1* | 1/2018 | Leijtens | G02B 6/264 |
| | | | 385/28 |
| 2020/0057192 A1 | 2/2020 | Nakanishi et al. | |

* cited by examiner

INTERPOSER CIRCUIT

TECHNICAL FIELD

The present invention relates to a connection structure between a silicon optical circuit and a fiber block that includes optical fibers, and more specifically to an interposer circuit for connecting the silicon optical circuit and the fiber block to each other.

BACKGROUND ART

Communication capacity is increasing along with the development of information communication technologies. Studies and development are actively carried out regarding optical modules that are downsized and have higher performance to increase the communication capacity per device.

Silicon photonics is a promising technology for realizing downsized optical modules having high performance. In optical circuits that employ this technology, silicon (Si) is used as a waveguide core material and quartz glass ($SiO_2$) is used as a clad material. An Si waveguide has a large specific refractive index difference between the core and the clad material, and accordingly, the cross-sectional area and the minimum bend radius of the waveguide are significantly smaller than those in optical circuits constituted by other materials, and this enables high-density integration.

For practical use of an Si optical circuit through modularization, it is necessary to connect input/output optical fibers.

FIG. 1 is a schematic diagram showing a connection structure between an Si optical circuit and optical fibers. As shown in FIG. 1, a fiber block 102 in which small-diameter core optical fibers 104 are aligned on a glass substrate and fixed thereto is connected to an Si optical circuit 101. The optical fibers 104 are connected to input/output waveguides 103 in the Si optical circuit 101. The optical fibers 104 are inclined with respect to an interface between the Si optical circuit 101 and the fiber block 102 to prevent recoupling of light reflected from the interface and increase a return loss.

An Si waveguide that satisfies single-mode conditions has a mode-field diameter (MFD) of about several hundreds nm, and a small-diameter core optical fiber has an MFD of about 4 μm. If the Si waveguide satisfying the single-mode conditions and the small-diameter core optical fiber are directly connected to each other, a large connection loss occurs. In order to reduce the connection loss by increasing the MFD of the Si waveguide side, a spot size converter (SSC) 105 is provided in the vicinity of an input/output end surface of each input/output waveguide 103.

Furthermore, the small-diameter optical fibers 104 are connected to standard single mode fibers (SSMFs) 107 that have an MFD of about 10 μm via MFD conversion means 106 in a manner that suppresses loss. An example of the MFD conversion means 106 is fusion that is performed using a thermally-diffused expanded core (TEC) optical fiber.

With this configuration, light can be input to and output from the Si optical circuit 101 using the SSMFs 107. The MFD is converted in two stages as described above because it is difficult to increase the MFD from several hundreds nm to 10 μm at a time using the SSC 105.

Although the MFD is increased by the SSC 105 at the input/output end surface of the input/output waveguide 103, the increased MFD is as small as about 4 μm, and accordingly, precise positioning needs to be performed with respect to the fiber block 102 to realize connection with low loss.

The connection method described above has the following problems.

A first problem is in that, although the fiber block 102 is usually manufactured by arranging the plurality of optical fibers 104 along V-shaped grooves, it is not possible to precisely position all of the optical fibers with respect to the input/output waveguides 103 and realize low-loss connection for all ports because of a dimensional variation in the V-shaped grooves and positional shifting due to eccentricity of cores of the optical fibers. A second problem is in that a distance between the fibers in the fiber block cannot be made smaller than the outer diameter of the fibers, and accordingly, if there are many ports, the fibers occupy a large width and the size of the Si optical circuit is increased. A third problem is in that the MFD conversion means 106 is large and increases the size of the entire optical module. For example, the length of a fusion sleeve that is necessary to perform TEC fusion is at least about 1 cm.

NPL 1 discloses a configuration in which an intermediate 0.75% Δ planar lightwave circuit (PLC) is interposed as a connection optical circuit (hereinafter referred to as an "interposer circuit") between a PLC that has a specific refractive index difference (Δ) of 1.5% and an SSMF (0.3% Δ).

Such an interposer circuit is also applicable to a case where SSMFs are connected to an Si optical circuit, and can solve the problems described above.

Advantages of the use of the interposer circuit are the followings. Low-loss connection can be realized by matching the MFD between the optical circuit and the interposer circuit and between the fibers and the interposer circuit, and therefore the MFD conversion means is unnecessary (the third problem is solved). Unlike the positional accuracy of the fiber block 102, the positional accuracy of interposer waveguides is the accuracy achieved through photolithography, and therefore a positional variation is suppressed and a low connection loss is achieved with respect to a plurality of ports (the first problem is solved). Also, a pitch can be converted in the interposer circuit, and therefore the pitch between waveguides on the Si optical circuit side is not limited by the outer diameter of the fibers, and the Si optical circuit can be kept small (the second problem is solved).

CITATION LIST

Non Patent Literature

[NPL 1] M. Ishii et al., "Low-loss fibre-pigtailed 256 channel arrayed-waveguide grating multiplexer using cascaded laterally-tapered waveguides", Electronics Letters, vol. 37, no. 23, pp. 1401-1402, 2001

SUMMARY OF THE INVENTION

Technical Problem

However, if the interposer circuit is used to connect optical fibers and the Si optical circuit, the number of connection points is increased to two, and there is a problem in that crosstalk occurs as a result of leaking light that is not coupled at a first connection point (between the optical fibers and the interposer circuit) being unintentionally coupled with a near port at a second connection point (between the interposer circuit and the Si optical circuit).

Although a crosstalk value that is to be satisfied varies according to applications, a crosstalk value of −45 dB or less is commonly required in many cases.

A method for realizing low crosstalk is setting positional offset between input and output by using S-shaped waveguides as in the case of an interposer circuit described in NPL 1. Light that leaks at the first connection point goes straight, but light that is coupled with a connection waveguide is guided to a position where leaking light is absent and reaches the second connection point, and therefore crosstalk can be avoided. However, there is a problem in that a small optical module cannot be realized because the size of the interposer circuit is increased by the S-shaped waveguides as described later.

The present invention was made in view of the problems described above, and an object of the present invention is to improve crosstalk between ports while keeping an interposer circuit small when the interposer circuit is used for connection of fibers.

Means for Solving the Problem

To achieve the object described above, an aspect of the present invention is an interposer circuit configured to connect an optical circuit and a fiber block to each other, the optical circuit including a plurality of input/output waveguides, the fiber block including a plurality of input/output fibers, the interposer circuit including: a first surface that is connected to the optical circuit; a second surface that is connected to the fiber block and is located opposite to the first surface in parallel with the first surface; and a plurality of connection waveguides that are connected to the input/output waveguides and the input/output fibers.

In an interposer circuit according to an embodiment, the connection waveguides each have a straight shape, and an angle formed between the first surface and each of the connection waveguides is the same as an angle formed between the second surface and each of the connection waveguides.

In an interposer circuit according to another embodiment, when an axis that extends along the first surface is taken to be an x axis, and an axis that is orthogonal to the x axis is taken to be a y axis, an angle formed between the y axis and each of the connection waveguides in the vicinity of a point of connection with a corresponding one of the input/output waveguides differs from an angle formed between the y axis and each of the connection waveguides in the vicinity of a point of connection with a corresponding one of the input/output fibers.

Effects of the Invention

As described above, according to the present invention, it is possible to improve crosstalk between ports while keeping an interposer circuit small when the interposer circuit is used for connection of fibers.

DESCRIPTION OF EMBODIMENTS

The following describes embodiments of the present invention in detail with reference to the drawings. The same or similar sings denote the same or similar elements, and redundant descriptions will be omitted. Numerical value examples and the names of materials described below are examples and do not limit the present invention, and the present invention can be implemented using other numerical values and materials.

First, as a reference of comparison, an interposer circuit according to a conventional technology in which S-shaped waveguides are used will be described with reference to FIG. 2. In the following description, this interposer circuit will also be referred to as an S-type interposer circuit.

Figure 1:
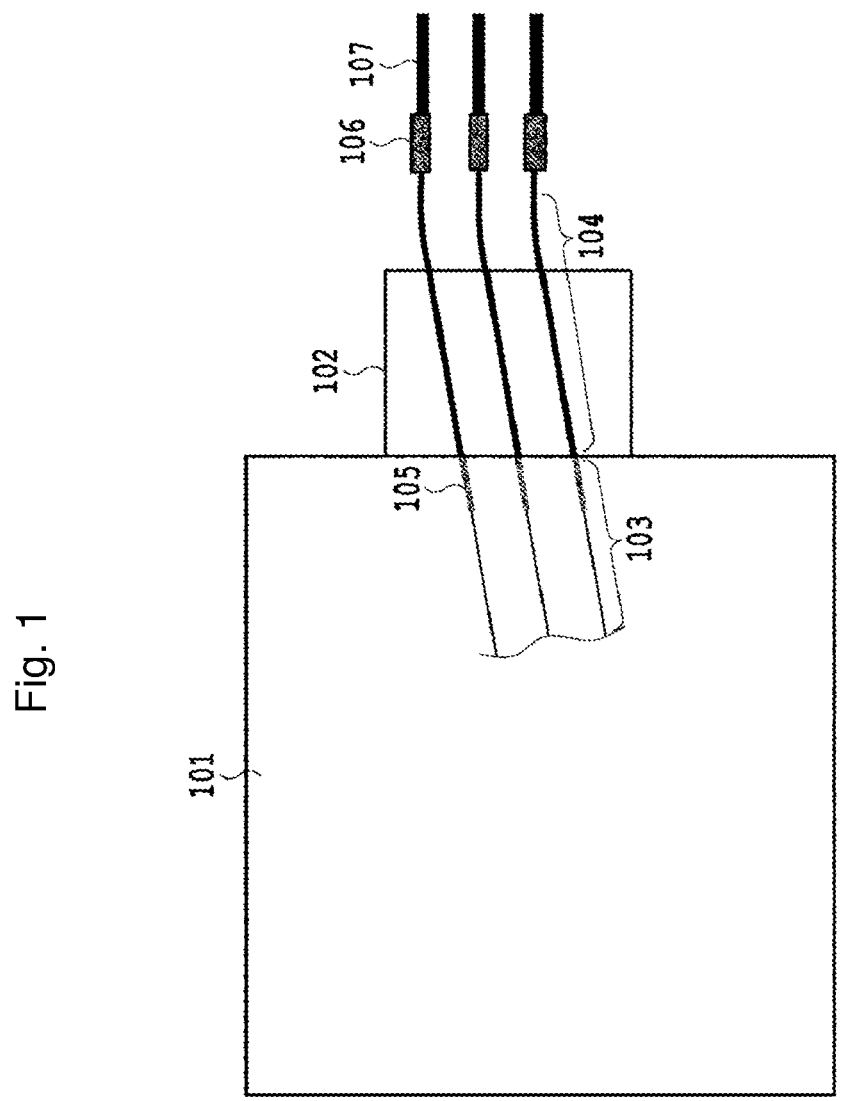
FIG. 1 is a diagram for explaining a conventional connection structure between an Si optical circuit and optical fibers in which an interposer circuit is not used.
Figure 2:
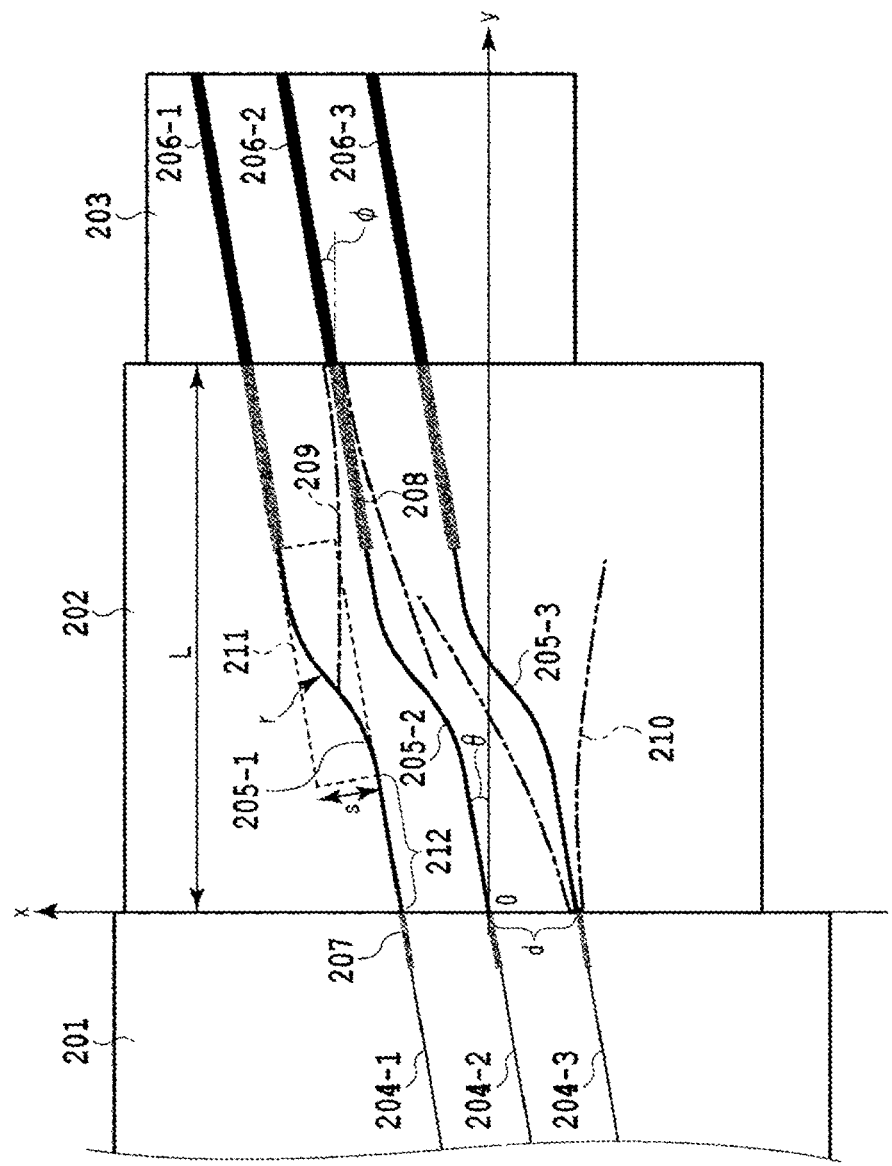
FIG. 2 is a diagram for explaining a conventional connection structure between an Si optical circuit and optical fibers in which an interposer circuit is used.

As shown in FIG. 2, an interposer circuit 202 is connected to an Si optical circuit 201, and a fiber block 203 is connected to the interposer circuit 202. The Si optical circuit 201 includes input/output waveguides 204-1 to 204-3. The interposer circuit 202 includes interposer waveguides 205-1 to 205-3. Optical fibers that are arranged in the fiber block 203 are SSMFs 206-1 to 206-3. A distance between the input/output waveguides 204-1 to 204-3 in the Si optical circuit 201 is denoted with d. The interposer waveguides 205-1 to 205-3 are respectively connected to the input/output waveguides 204-1 to 204-3. Furthermore, the SSMFs 206-1 to 206-3 are respectively connected to the interposer waveguides 205-1 to 205-3.

An SSC 207 is arranged for each of the input/output waveguides 204-1 to 204-3 to match the MFD with each interposer waveguide 205 at a connection surface between the Si optical circuit 201 and the interposer circuit 202. Similarly, an SSC 208 is arranged for each of the interposer waveguides 205-1 to 205-3 to match the MFD with each of the SSMFs 206-1 to 206-3 at a connection surface between the interposer circuit 202 and the fiber block 203.

Each interposer waveguide 205 includes the SSC 208, an S-shaped waveguide 211, and a stabilizing region 212. The stabilizing region 212 is constituted by a straight waveguide and is provided to suppress field shape distortion that occurs in the S-shaped waveguide 211. Such a stabilizing region constituted by a straight waveguide is commonly provided next to a bent waveguide. The length of the SSC 208 is denoted with L_SSC and the length of the stabilizing region 212 is denoted with L_ST. The S-shaped waveguide 211 is constituted by two arcs, and the width of the S-shaped waveguide 211 is denoted with s and the bend radius of the S-shaped waveguide 211 is denoted with r as shown in FIG. 2. If s and r are given, the shape of the S-shaped waveguide 211 is uniquely determined.

The connection surface between the Si optical circuit 201 and the interposer circuit 202 and the connection surface between the interposer circuit 202 and the fiber block 203 are located opposite to each other in parallel with each other.

An axis that extends along the connection surface between the Si optical circuit 201 and the interposer circuit 202 is taken to be an x axis, and an axis that is orthogonal to the x axis is taken to be a y axis. A connection point between the interposer waveguide 205-2 and the input/output waveguide 204-2 is taken to be an intersection between the x axis and the y axis, which is the origin (x=0, y=0). The direction from the optical circuit 201 toward the fiber block 203 is taken to be the positive direction of the y axis, and a direction that is obtained by turning the positive direction of the y axis counterclockwise by 90 degrees is taken to be the positive direction of the x axis. The length of the interposer circuit 202 along the y axis is denoted with L. An angle that the interposer waveguide 205-1 forms with respect to the y axis at a point where y=0 is denoted with θ, and an angle that the interposer waveguide 205-1 forms with respect to the y axis at a point where y=L is denoted with φ. Note that a positive value is given to an angle in the counterclockwise direction in the drawings, and a negative value is given to an angle in the clockwise direction in the drawings.

Assume that light is input from the right side to the SSMF 206-2. Ideally, it is desirable that the light propagates only to the input/output waveguide 204-2 via the interposer waveguide 205-2, but actually a portion of the light propagates to the input/output waveguides 204-1 and 204-3 as crosstalk. The amount of crosstalk can be calculated as follows.

If the light input from the SSMF 206-2 is coupled with the interposer waveguide 205-2 at a coupling efficiency η, an uncoupled portion of the light, the ratio of which is (1−η), undergoes free-space propagation from that point without being confined. However, assume that the light is released from confinement only in the xy plane and is still confined in the direction perpendicular to the sheet face of the drawing. The amount of crosstalk can be found by calculating an amount of the light coupled with the input/output waveguides 204-1 and 204-3.

Leaking light that undergoes free-space propagation from the SSMF 206-2 to the inside of the interposer circuit 202 is approximated using a Gaussian beam (indicated by a dash-dot line 209 in FIG. 2). Also, light receiving profiles of the input/output waveguides 204-1 and 204-3 are approximated as Gaussian beams (indicated by a dash-dot-dot line 210 in FIG. 2).

A beam diameter at a connection point between each input/output waveguide 204 and a corresponding interposer waveguide 205 is denoted with $\omega_1$. Similarly, a beam diameter at a connection point between each interposer waveguide 205 and a corresponding SMMF 206 is denoted with $\omega_2$. Here, the term "beam diameter" refers to a value that is half the MFD.

Calculation conditions are set as follows: $\omega_1$=2 μm, $\omega_2$=5 μm, θ=φ=10°, L_SSC=700 μm, L_ST=300 μm, r=1000 μm, η=−1 dB, and d=100 μm. Also, refractive indexes of propagation mediums are uniformly approximated as 1.45 for the sake of convenience. Also, assume that a reference crosstalk value that is to be satisfied is −45 dB.

It is found through calculation that if the width s of the S-shaped waveguide is 76.3 μm, crosstalk to the input/output waveguide 204-3 located at a position where x=−d=−100 μm is −45 dB. At this time, the length L of the interposer circuit 202 is 1531 μm.

Figure 3:
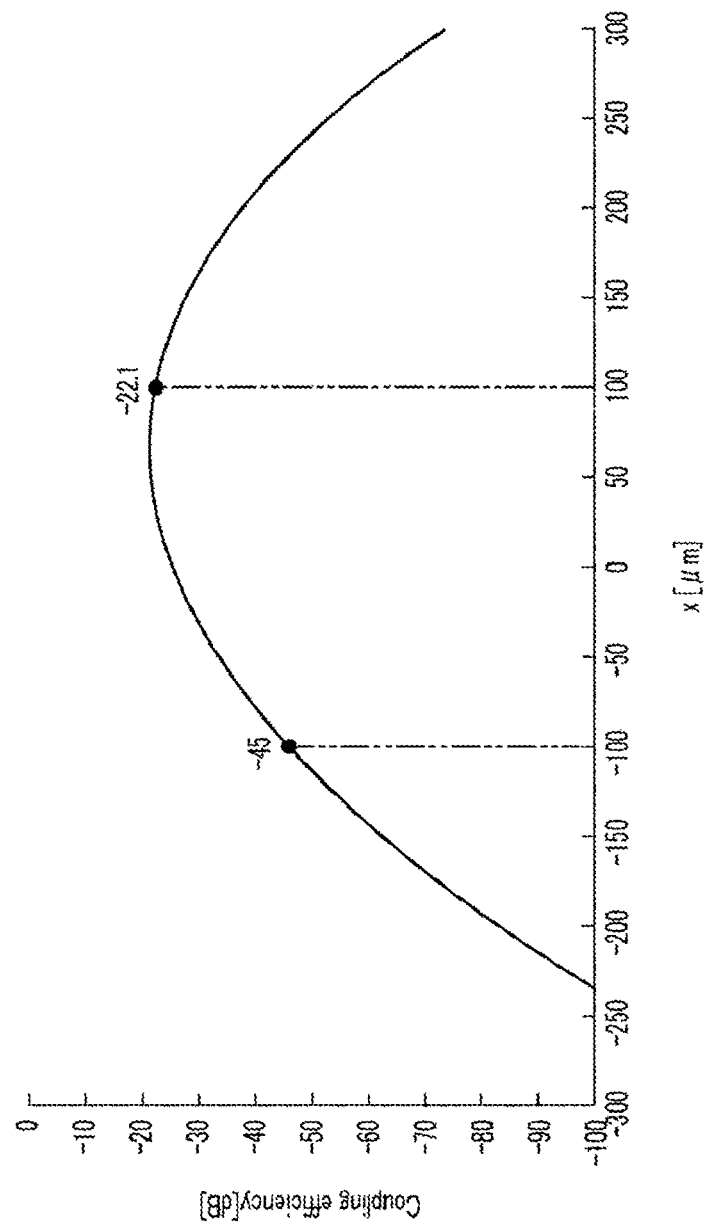
FIG. 3 is a graph showing crosstalk amounts in an S-type interposer circuit.

FIG. 3 shows a graph of the crosstalk amount with respect to a position x when an input/output waveguide 204 is located at the position x. It can be found that the center of the beam is shifted to the positive side of the x axis by the S-shaped waveguide 211. As a result, crosstalk to the input/output waveguide 204-3 reaches −45 dB, but crosstalk to the input/output waveguide 204-1 is −22.1 dB and does not satisfy the reference crosstalk value.

First Embodiment

Next, an interposer circuit according to a first embodiment of the present invention will be described with reference to FIG. 4.

According to the present embodiment, it is possible to realize an interposer circuit that is downsized and reduces crosstalk to ports on both the positive and negative sides of the x axis, when compared to the S-shaped interposer circuit described above with reference to FIG. 2.

Figure 4:
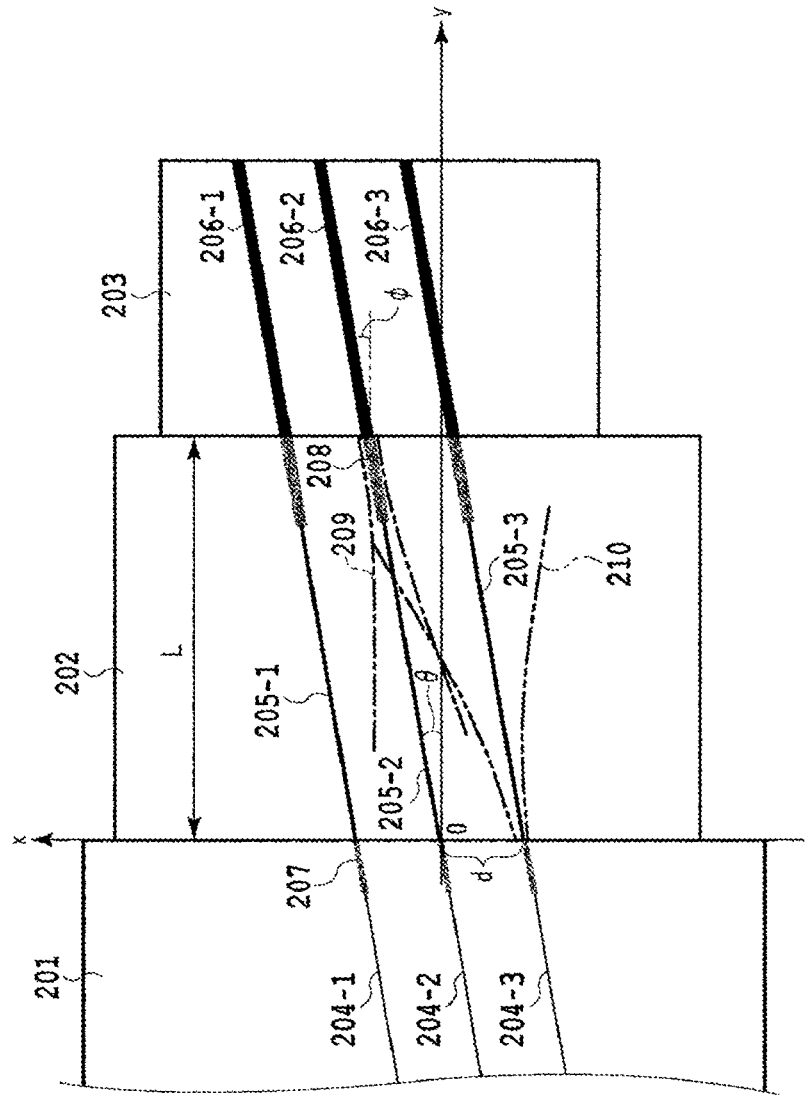
FIG. 4 is a diagram for explaining an I-type interposer circuit according to an embodiment of the present invention.

As shown in FIG. 4, in the present embodiment as well, the interposer circuit 202 is connected to the Si optical circuit 201, and the fiber block 203 is connected to the interposer circuit 202 as described above with reference to FIG. 2. Configurations of the Si optical circuit 201 and the fiber block 203, connection relationships between the input/output waveguides 204-1 to 204-3 and the interposer waveguides 205-1 to 205-3, and connection relationships between the interposer waveguides 205-1 to 205-3 and the SSMFs 206-1 to 206-3 are the same as those described above with reference to FIG. 2.

In the interposer circuit 202 of the present embodiment, the interposer waveguides 205-1 to 205-3 each have a straight shape. In the following description, the interposer circuit including such I-shaped interposer waveguides will also be referred to as an I-type interposer circuit.

In the I-type interposer circuit, the SSC 208 is necessary, but the stabilizing region 212 is unnecessary because the I-type interposer circuit does not include bent waveguides constituting the S-shaped waveguides 211.

In the I-type interposer circuit, if the length L is given, the shape of the interposer waveguides 205 is uniquely determined and a positional relationship between the Gaussian beams 209 and 210 is determined, and accordingly, crosstalk can be calculated.

Similarly to the case of the S-type, calculation conditions are set as follows: $\omega_1$=2 μm, $\omega_2$=5 μm, θ=φ=10°, L_SSC=700 μm, and η=−1 dB.

It is found through calculation that if L=906 μm, crosstalk to the input/output waveguide 204-3 is −45 dB. This value is larger than the length L_SSC of the SSC 208, and therefore the SSC 208 can be provided with no difficulty.

Figure 5:
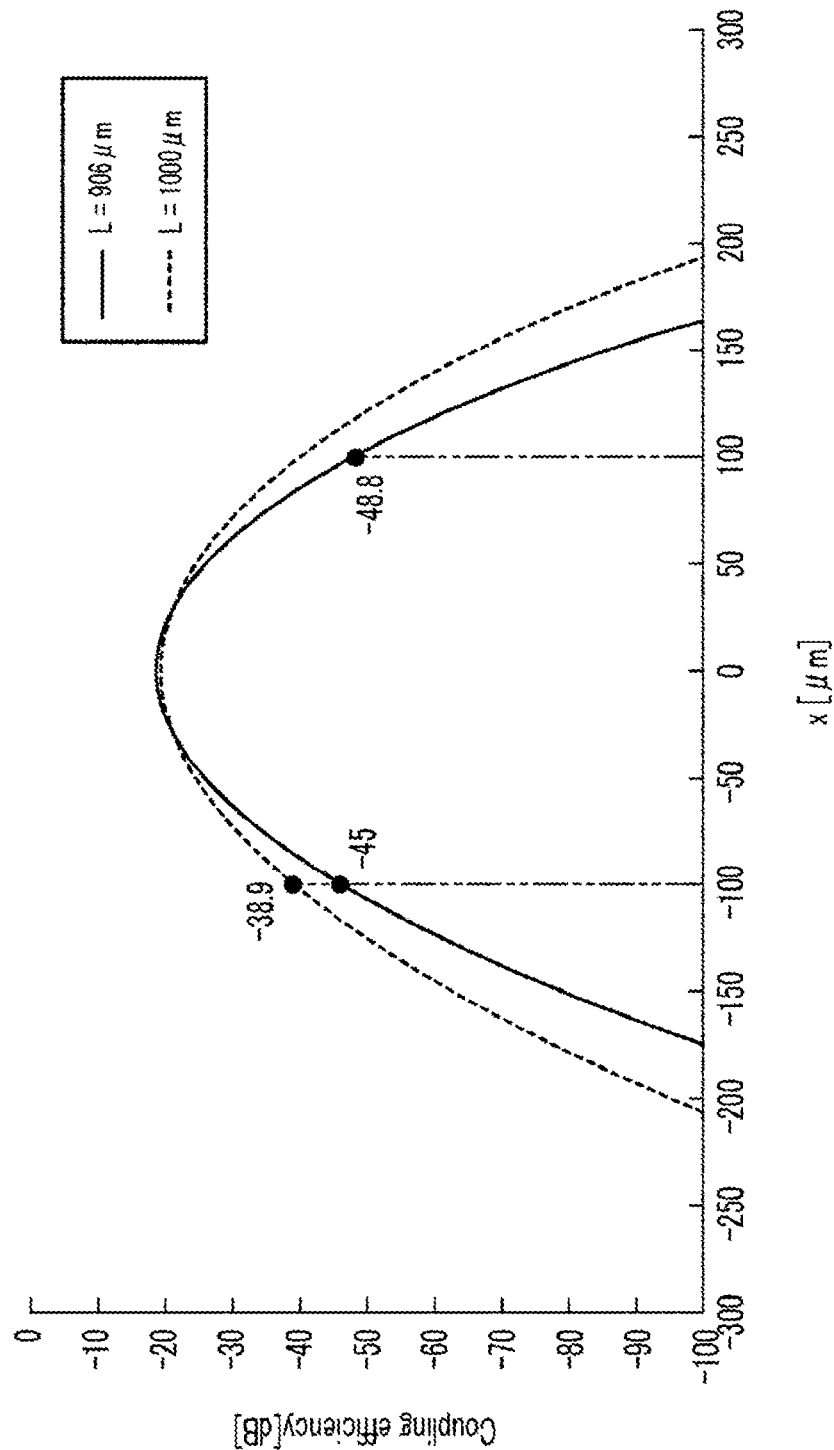
FIG. 5 is a graph showing crosstalk amounts in the I-type interposer circuit.

FIG. 5 shows graphs of the crosstalk amount with respect to a position x when an input/output waveguide 204 is located at the position x in the case where L=906 μm and also in the case where L=1000 μm for comparison.

In the case where L=1000 μm, the crosstalk is −38.9 dB and does not satisfy the reference crosstalk value of −45 dB, but if the length L is reduced to 906 μm, the reference crosstalk value of −45 dB can be satisfied. This indicates that when the beam reaches the x axis, the beam has not spread to such an extent that the beam is coupled with an adjacent port by −45 dB or more.

Also, crosstalk to the input/output waveguide 204-1 located at a position where x=100 μm can be made as low as −48.8 dB. This is because, unlike the case of the S-type, crosstalk is reduced by reducing L, rather than shifting a peak position of the beam. It goes without saying that no problem occurs even if another port is further provided on the outer side.

Next, a method for easily determining the maximum value of L (denoted with L_max) when the distance d between the input/output waveguides 204-1 to 204-3 is changed will be described. If the distance d between the input/output waveguides 204-1 to 204-3 is small, L needs to be reduced, and there is a substantially linear relationship between d and L_max.

Figure 6:
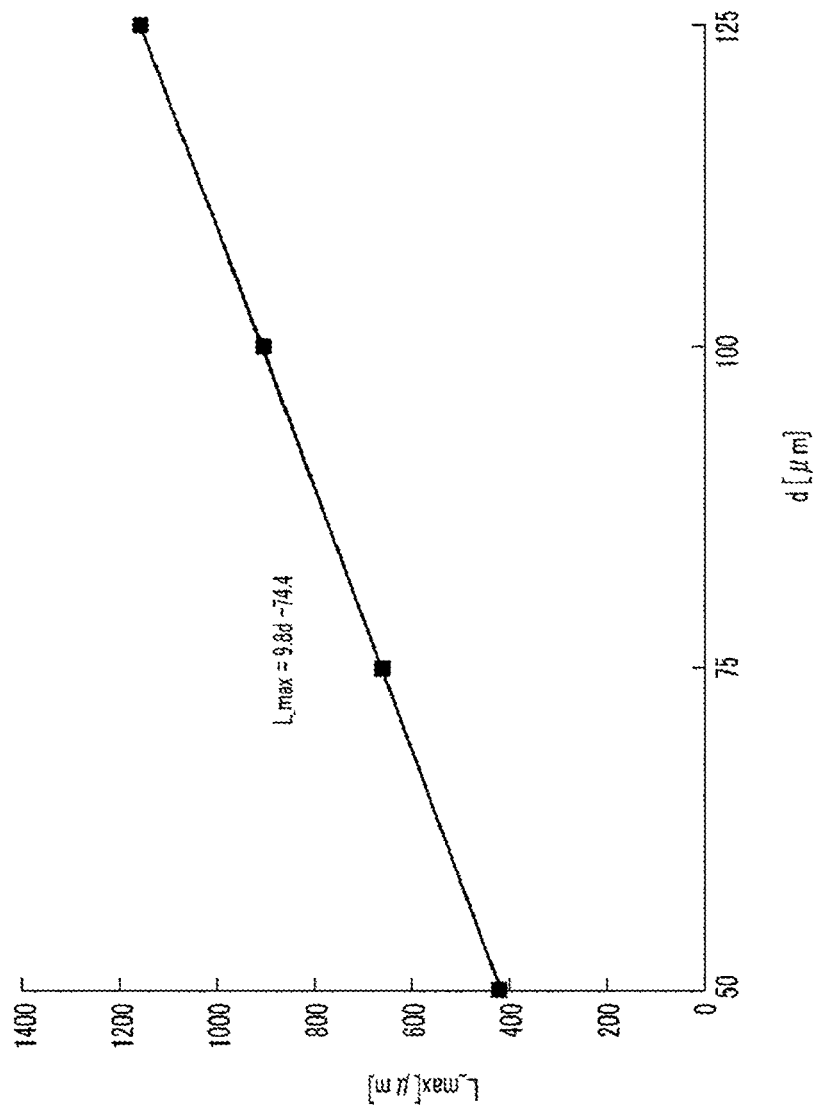
FIG. 6 is a graph showing a relationship between d and L_max that makes the crosstalk amount in the I-type interposer circuit −45 dB.

FIG. 6 shows a relationship between d and L_max for realizing crosstalk of −45 dB. It was found that a relational expression can be approximated as $$L\_max = 9.8d - 74.4$$

where the units of L_max and d are both μm. The crosstalk of −45 dB or less can be achieved if L is set to be smaller than L_max expressed by this expression.

Also, as a matter of course, L_max changes if the required crosstalk value is changed. If lower crosstalk is required, L_max becomes smaller. Relationships between d and L_max are as follows in cases where the crosstalk value is −55 dB and −35 dB.

$$L\_max = 13.7d - 159.0 \text{ (the case where the crosstalk value is } -35 \text{ dB)}$$

$$L\_max = 8.1d - 50.6 \text{ (the case where the crosstalk value is } -55 \text{ dB)}$$

As described above, it is possible to configure an interposer circuit that is smaller than the S-type interposer circuit and achieves low crosstalk on both the positive and negative sides of the x axis if the I-type interposer circuit is used and L is set to be shorter than a predetermined value.

However, depending on the value of d and the required crosstalk value, there may be a case where L_max is smaller than L_SSC and the interposer circuit cannot be realized. In such a case, the I-type interposer circuit cannot be used.

Second Embodiment

Next, an interposer circuit according to a second embodiment of the present invention will be described with reference to FIG. 7.

Figure 7:
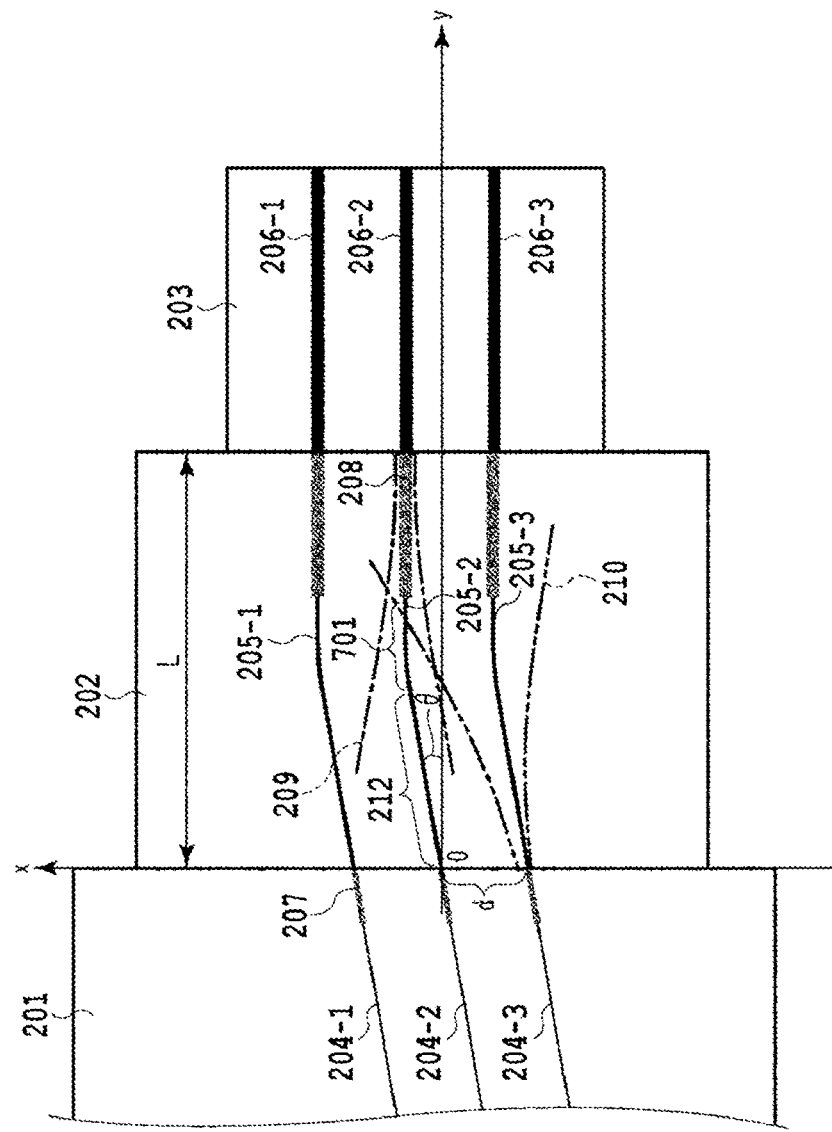
FIG. 7 is a diagram for explaining a J-type interposer circuit according to an embodiment of the present invention.

As shown in FIG. 7, in the present embodiment as well, the interposer circuit 202 is connected to the Si optical circuit 201, and the fiber block 203 is connected to the interposer circuit 202 as described above with reference to FIG. 2. Configurations of the Si optical circuit 201 and the fiber block 203, connection relationships between the input/output waveguides 204-1 to 204-3 and the interposer waveguides 205-1 to 205-3, and connection relationships between the interposer waveguides 205-1 to 205-3 and the SSMFs 206-1 to 206-3 are the same as those described above with reference to FIG. 2.

Unlike the I-type interposer circuit described above with reference to FIG. 4, in the interposer circuit of the present embodiment shown in FIG. 7, θ=10° but φ=0°. Consequently, the interposer waveguides 205-1 to 205-3 each include a bent waveguide. The interposer circuit including such J-shaped interposer waveguides will also be referred to as a J-type interposer circuit.

Each interposer waveguide 205 includes the SSC 208, a bent waveguide 701, and the stabilizing region 212.

The bent waveguide 701 has an arc shape of which the bend angle is θ and the radius is r.

Similarly to the above-described cases, calculation conditions are set as follows: $\omega_1 = 2$ μm, $\omega_2 = 5$ μm, L_SSC=700 μm, L_ST=300 μm, r=1000 μm, and η=−1 dB.

Figure 8:
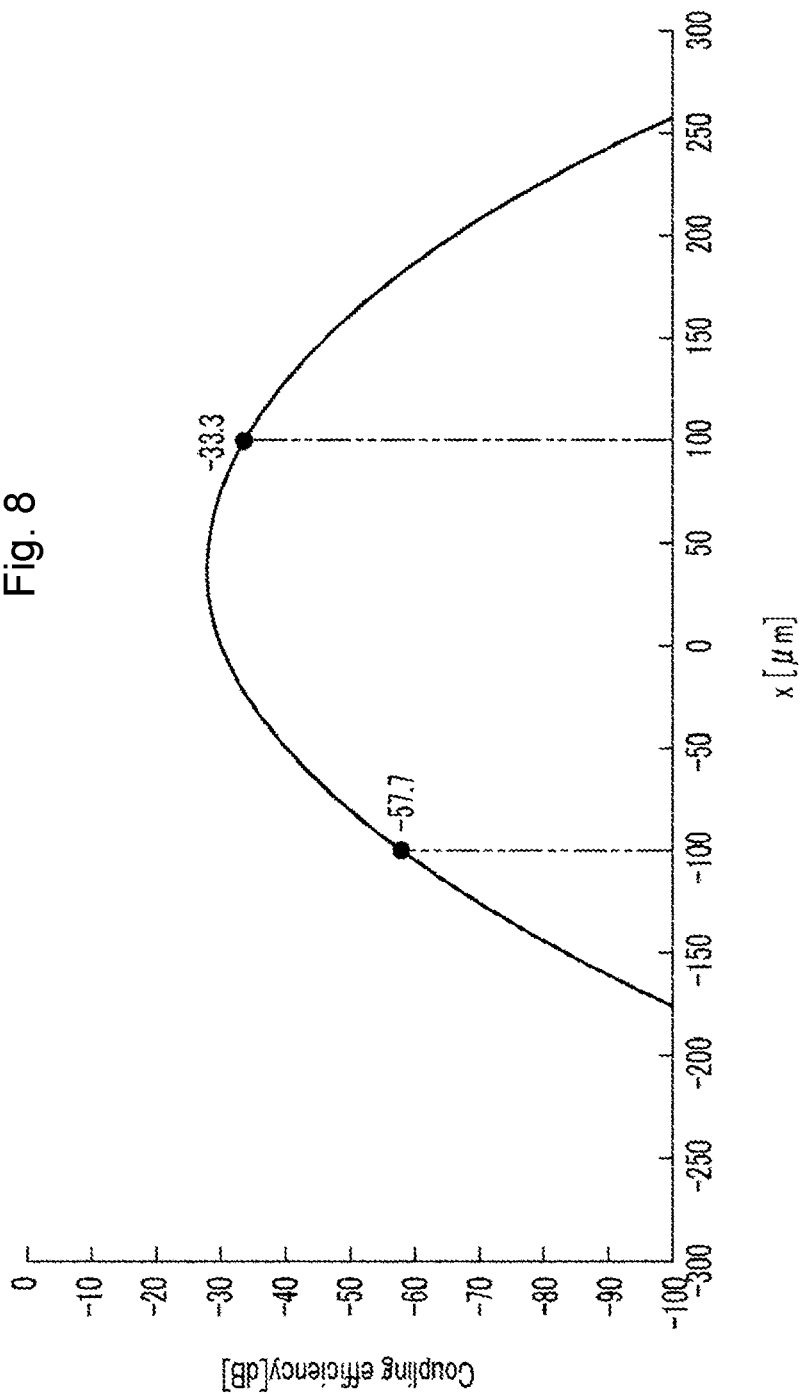
FIG. 8 is a graph showing crosstalk amounts in the J-type interposer circuit.

FIG. 8 shows a graph of the crosstalk amount with respect to a position x when an input/output waveguide 204 is located at the position x.

Crosstalk to the input/output waveguide 204-3 is −57.7 dB and satisfies the reference crosstalk value. At this time, L is 1169 μm, and it can be found that L can be made shorter than that in the S-type interposer circuit.

In the S-type interposer circuit, crosstalk is reduced by using only a positional shift, but in the J-type interposer circuit of the present embodiment, in addition to a positional shift, an angular shift also contributes to a reduction in the coupling efficiency, and therefore it is possible to configure a small interposer circuit.

As described above, if the J-type interposer circuit is used, an interposer circuit that achieves low crosstalk can be configured with a size smaller than that of the S-type interposer circuit.

Also, φ=0° in the J-type interposer circuit, and therefore there is an advantage in that an error in the distance between fibers that occurs due to deviation of a polishing angle of the fiber block 203 is suppressed. That is, in the case of the I-type interposer circuit in which φ=10°, the distance between fibers changes by about 0.16% if the angle of a surface of the fiber block 203 that is connected to the interposer circuit 202 deviates by 0.5° due to a machining error. However, if φ=0°, the distance between fibers changes by only about 0.004% with respect to the same deviation of 0.5° due to machining.

Similarly to the S-type interposer circuit, the J-type interposer circuit cannot reduce crosstalk on the positive side of the x axis, and therefore is suited to a case where it does not matter even if crosstalk to the input/output waveguide 204-1 is high or a case where the input/output waveguide 204-1 is not provided (an adjacent waveguide is provided only on the negative side of the x axis).

Third Embodiment

Next, a third embodiment of the present invention will be described.

Figure 9:
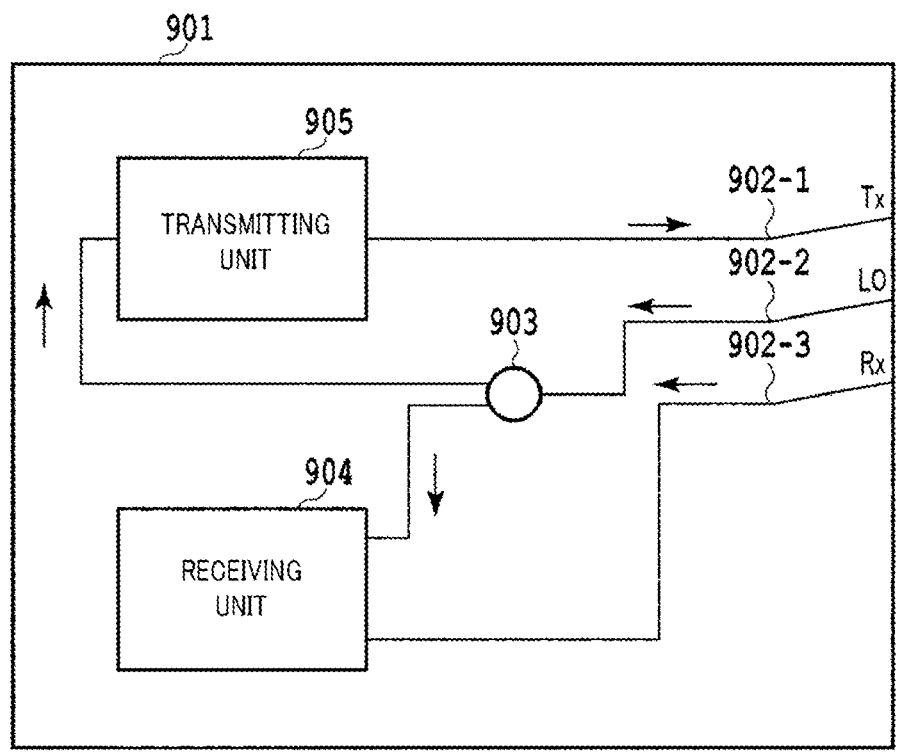
FIG. 9 is a diagram for explaining optical [FIG. 10]

FIG. 9 schematically shows an optical transmission/reception circuit 901, i.e., an Si optical circuit that transmits and receives light. The optical transmission/reception circuit 901 is an example of the Si optical circuit 201. The optical transmission/reception circuit 901 includes three input/output waveguides 902-1 to 902-3, a receiving unit 904, a transmitting unit 905, and an optical branching circuit 903 of which an input is connected to the input/output waveguide 902-2 and two outputs are respectively connected to the receiving unit 904 and the transmitting unit 905. Arrows in FIG. 9 indicate directions in which light proceeds.

The input/output waveguide 902-2 is called an LO port, and local light (LO light) for coherent reception is input to the LO port. In the optical branching circuit 903, the LO light branches into two portions, and one of the portions is input to the receiving unit 904. The receiving unit 904 includes a 90° optical hybrid, a photodetector, and the like.

The input/output waveguide 902-3 is called an Rx port, and a modulation signal that is to be received is input to the Rx port. Received light from the Rx port is transmitted to the receiving unit 904, and is received using the LO light input from the LO port.

The input/output waveguide 902-1 is called a Tx port, and a transmission signal is transmitted from the Tx port. The other portion of light that has branched in the optical branching circuit 903 is transmitted to the transmitting unit 905 that includes a modulator and the like, is modulated, and is transmitted as the transmission signal from the Tx port.

Since the LO light is caused to branch and is then input to the transmitting unit 905 and the receiving unit 904, it is desirable that the three input/output waveguides 902-1 to 902-3 are arranged such that the LO port is located at the center, i.e., between the Tx port and the Rx port. If the input/output waveguides are arranged otherwise, it is necessary to form intersections that would otherwise be unnecessary between the waveguides, or a waveguide path from a chip end to the transmitting unit 905 or the receiving unit 904 becomes very long, and there is a problem in that loss is increased.

Therefore, it is necessary to design a circuit giving consideration to both crosstalk to the Tx port (the input/output waveguide 902-1) and crosstalk to the Rx port (the input/output waveguide 902-3) when light is input to the LO port (the input/output waveguide 902-2).

When the crosstalk to the Tx port and the crosstalk to the Rx port are compared with each other, more strict conditions are required with respect to the crosstalk to the Rx port. The intensity of the LO light is very high in order to output the transmission signal with a high intensity. On the other hand, light that is input to the Rx port is signal light that has been attenuated through transmission, and the intensity of this light is low. Accordingly, the SN ratio of the received signal is significantly deteriorated even by low crosstalk. In a typical example, if the intensity of the LO light is +18 dBm and the intensity of the received light is −20 dBm, crosstalk needs to be suppressed to be less than −53 dB to achieve an SN ratio of 15 dB.

As described above, in the optical transmission/reception circuit 901, it is necessary to suppress both of the crosstalk of the LO light from the LO port to the Tx port and the crosstalk of the LO light from the LO port to the Rx port, and further suppress the crosstalk of the LO light from the LO port to the Rx port selectively. Here, assume that a value that is to be satisfied with respect to the crosstalk to the Tx port is −45 dB or less, and a value that is to be satisfied with respect to the crosstalk to the Rx port is −53 dB or less.

In such a case, the S-type interposer circuit and the J-type interposer circuit cannot be used since crosstalk is high on one side of these interposer circuits. Also, even if the I-type interposer circuit is used, it is not possible to realize a configuration for particularly reducing crosstalk to an adjacent port on one side. An interposer circuit according to the third embodiment of the present invention is suited to a case where it is necessary to suppress crosstalk to adjacent ports on both sides and further suppress crosstalk to a port on one side selectively.

Figure 10:
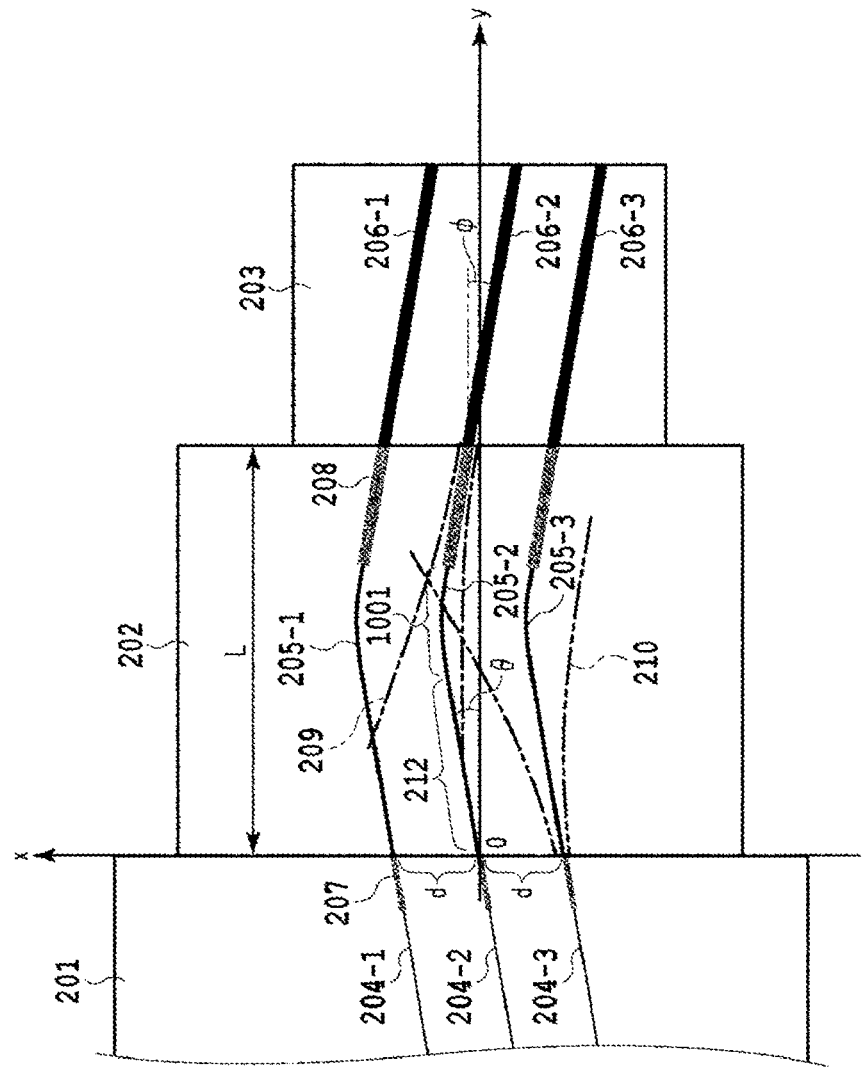
FIG. 10 is a diagram for explaining a V-type interposer circuit according to an embodiment of the present invention.

FIG. 10 shows a configuration of the interposer circuit according to the present embodiment. As shown in FIG. 7, in the present embodiment as well, the interposer circuit 202 is connected to the Si optical circuit 201, and the fiber block 203 is connected to the interposer circuit 202 as described above with reference to FIG. 2. Configurations of the Si optical circuit 201 and the fiber block 203, connection relationships between the input/output waveguides 204-1 to 204-3 and the interposer waveguides 205-1 to 205-3, and connection relationships between the interposer waveguides 205-1 to 205-3 and the SSMFs 206-1 to 206-3 are the same as those described above with reference to FIG. 2.

In the present embodiment, θ=10° and φ=−10°. The interposer waveguides 205-1 to 205-3 each have a V-shape. The interposer circuit including such V-shaped interposer waveguides will also be referred to as a V-type interposer circuit.

Each interposer waveguide 205 includes the SSC 208, a bent waveguide 1001, and the stabilizing region 212.

The bent waveguide 1001 has an arc shape of which the bend angle is $|\theta-\varphi|$ and the radius is r.

Similarly to the above-described cases, calculation conditions are set as follows: $\omega_1$=2 μm, $\omega_2$=5 μm, L_SSC=700 μm, L_ST=300 μm, r=1000 μm, and η=−1 dB.

Figure 11:
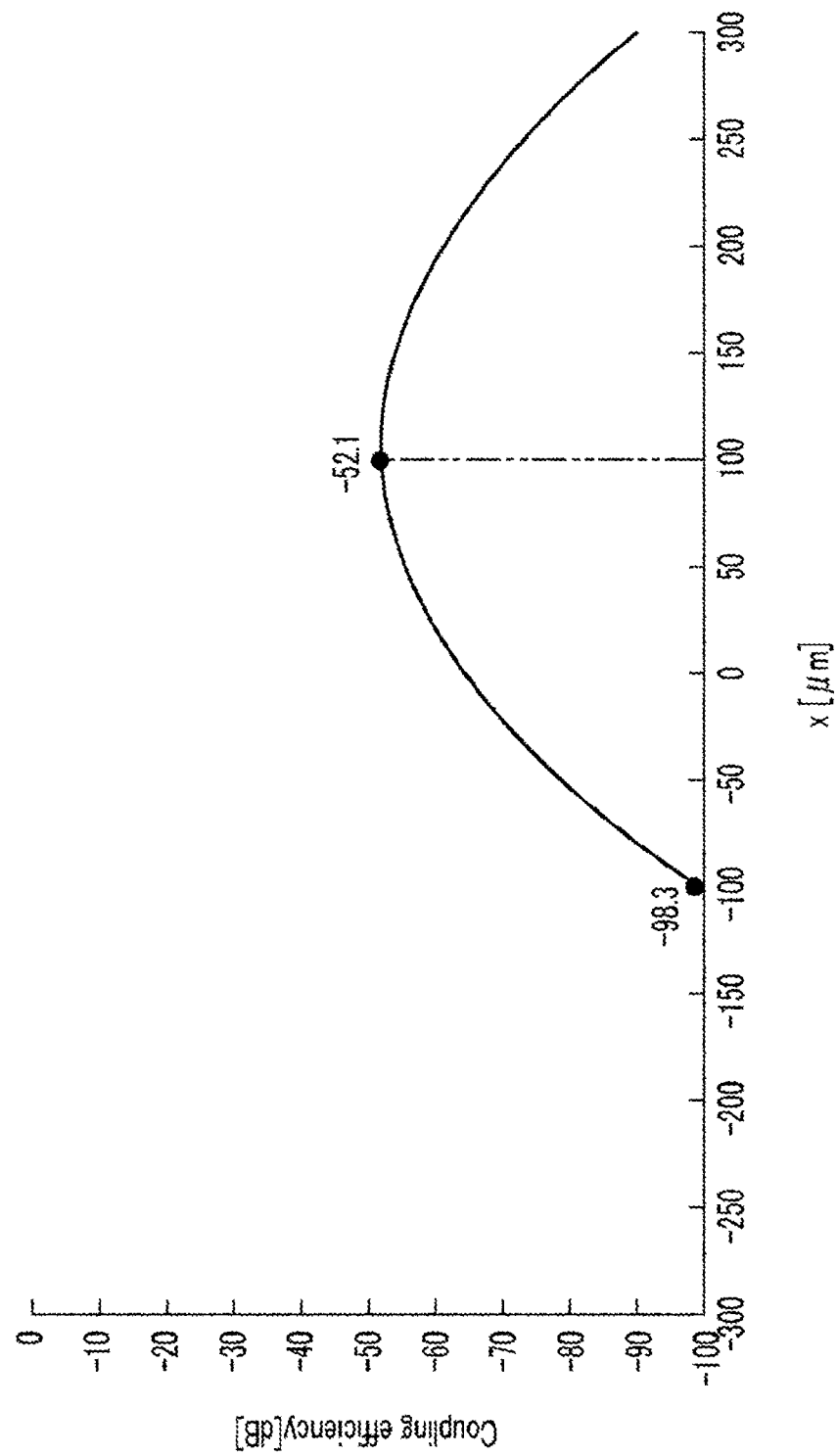
FIG. 11 is a graph showing crosstalk amounts in the V-type interposer circuit.

FIG. 11 shows a graph of the crosstalk amount with respect to a position x when an input/output waveguide 204 is located at the position x.

Crosstalk to the input/output waveguide 204-3 is −98.3 dB and is successfully suppressed to be significantly lower than the target value −53 dB. Also, crosstalk to the input/output waveguide 204-1 is −52.1 dB, which is lower than −45 dB.

At this time, L is 1332 μm, and it can be found that L is slightly larger than those in the I-type interposer circuit and the J-type interposer circuit, but can be made shorter than that in the S-type interposer circuit.

In the V-type interposer circuit, an angular difference between input and output is larger than that in the J-type interposer circuit, and the coupling efficiency is significantly reduced over the entire region of the x axis, and consequently the reference crosstalk values are satisfied although the position of the input/output waveguide 204-3 is almost the same as the peak position of the beam.

The maximum value of the crosstalk decreases as the angular difference $|\theta-\varphi|$ between input and output increases. The maximum value of the crosstalk is −45 dB if the angular difference is about 17.8°. That is, even if θ=8.9° and φ=−8.9°, the following relationship: crosstalk <−45 dB is satisfied over the entire region of the x axis.

As described above, the V-type interposer circuit is smaller than the conventional S-type interposer circuit, can achieve low crosstalk on both the positive and negative sides of the x axis, and particularly, can achieve very low crosstalk on one side selectively.

Calculation results of the size and crosstalk of the interposer circuits according to the first to third embodiments (I-type, J-type, and V-type) described above and the interposer circuit according to the conventional technology (S-type) are compared in the following table. "Good" indicates that −45 dB is satisfied, "Excellent" indicates that −53 dB is satisfied, and "Bad" indicates that none of these values is satisfied.

TABLE 1

|  | Conventional technology | Present invention | | |
| --- | --- | --- | --- | --- |
|  | S-type | I-type | J-type | V-type |
| Size | 1531 μm | 906 μm | 1169 μm | 1332 μm |
| Crosstalk (x = −100 μm) | −45 dB Good | −45 dB Good | −57.7 dB Good | −98.3 dB Excellent |
| Crosstalk (x = +100 μm) | −22.1 dB Bad | −48.8 dB Good | −33.3 dB Bad | −52.1 dB Good |

Although the bent waveguide 701 included in the J-type interposer circuit and the bent waveguide 1001 included in the V-type interposer circuit are described as having an arc shape, it is also possible to use waveguides that have a clothoid curve shape. If waveguides having a clothoid curve shape are used, light can be caused to propagate with lower loss.

REFERENCE SIGNS LIST 101, 201 Silicon optical circuit
102, 203 Fiber block
103, 204 Input/output waveguide
104 Small-diameter core optical fiber
105, 207, 208 Spot size converter
106 Mode-field diameter conversion means
107, 206 Single mode fiber
202 Interposer circuit
205 Interposer waveguide
209, 210 Gaussian beam
211 S-shaped waveguide
212 Stabilizing region
701, 1001 Bent waveguide
901 Optical transmission/reception circuit
902 Input/output waveguide
903 Optical branching circuit
904 Receiving unit
905 Transmitting unit

The invention claimed is:

1. An interposer circuit configured to connect an optical circuit and a fiber block to each other, the optical circuit including a plurality of input/output waveguides, the fiber block including a plurality of input/output fibers, the interposer circuit comprising:
a first surface that is connected to the optical circuit;
a second surface that is connected to the fiber block and is located opposite to the first surface in parallel with the first surface; and
a plurality of connection waveguides that are connected to the input/output waveguides and the input/output fibers, wherein the connection waveguides each have a straight shape, and an angle formed between the first surface and each of the connection waveguides is the same as an angle formed between the second surface and each of the connection waveguides,
wherein, when an axis that extends along the first surface is taken to be an x axis, an axis that is orthogonal to the x axis is taken to be a y axis, and a distance between the input/output waveguides along the x axis is d [µm], the interposer circuit has a maximum length of 9.8d-74.4 [µm]or less along the y axis between the first surface and the second surface such that any crosstalk between the optical circuit and the fiber block is −45 dB or less.

2. An interposer circuit configured to connect an optical circuit and a fiber block to each other, the optical circuit including a plurality of input/output waveguides, the fiber block including a plurality of input/output fibers, the interposer circuit comprising:
a first surface that is connected to the optical circuit;
a second surface that is connected to the fiber block and is located opposite to the first surface in parallel with the first surface; and
a plurality of connection waveguides that are connected to the input/output waveguides and the input/output fibers, wherein, when an axis that extends along the first surface is taken to be an x axis, and an axis that is orthogonal to the x axis is taken to be a y axis, an angle formed between the y axis and each of the connection waveguides in the vicinity of a point of connection with a corresponding one of the input/output waveguides differs from an angle formed between the y axis and each of the connection waveguides in the vicinity of a point of connection with a corresponding one of the input/output fibers.

3. The interposer circuit according to claim 2, wherein a difference between the angle formed between the y axis and each of the connection waveguides in the vicinity of the point of connection with a corresponding one of the input/output waveguides and the angle formed between the y axis and each of the connection waveguides in the vicinity of the point of connection with a corresponding one of the input/output fibers is larger than 17.8 degrees.

4. The interposer circuit according to claim 2, wherein, when a direction from the optical circuit toward the fiber block is taken to be a positive direction of the y axis, and a direction that is obtained by turning the positive direction of the y axis counterclockwise by 90 degrees is taken to be a positive direction of the x axis, the angle formed between the y axis and each of the connection waveguides in the vicinity of the point of connection with a corresponding one of the input/output waveguides and the angle formed between the y axis and each of the connection waveguides in the vicinity of the point of connection with a corresponding one of the input/output fibers have different signs, and on both sides of at least one connection waveguide of the connection waveguides that inputs light to the optical circuit, at least one other connection waveguide of the connection waveguides is arranged.

5. The interposer circuit according to claim 3, wherein a first port that outputs a transmission signal, a second port to which light is input from an external light source, and a third port to which a received signal is input are arranged in that order in the optical circuit.

6. The interposer circuit according to claim 4, wherein a first port that outputs a transmission signal, a second port to which light is input from an external light source, and a third port to which a received signal is input are arranged in that order in the optical circuit.

7. The interposer circuit according to claim 2, wherein the angle formed between the y axis and each of the connection waveguides in the vicinity of the point of connection with a corresponding one of the input/output waveguides is not 0 degrees, and the angle formed between the y axis and each of the connection waveguides in the vicinity of the point of connection with a corresponding one of the input/output fibers is 0 degrees.

* * * * *